(12) United States Patent
Liao

(10) Patent No.: US 9,208,674 B2
(45) Date of Patent: Dec. 8, 2015

(54) SECURITY SYSTEM WITH POWER SAVING FEATURE AND DEVICE

(71) Applicant: Li-Shih Liao, Taipei (TW)

(72) Inventor: Li-Shih Liao, Taipei (TW)

( * ) Notice: Subject to any disclaimer, the term of this patent is extended or adjusted under 35 U.S.C. 154(b) by 278 days.

(21) Appl. No.: 13/795,099

(22) Filed: Mar. 12, 2013

(65) Prior Publication Data

US 2013/0229277 A1 Sep. 5, 2013

Related U.S. Application Data

(63) Continuation-in-part of application No. 12/835,712, filed on Jul. 13, 2010, now abandoned.

(51) Int. Cl.
| | |
|---|---|
| *G08B 23/00* | (2006.01) |
| *E05C 19/16* | (2006.01) |
| *G07C 9/00* | (2006.01) |
| *E05B 17/22* | (2006.01) |
| *H02J 9/00* | (2006.01) |
| *E05B 47/00* | (2006.01) |

(52) U.S. Cl.
CPC .............. *G08B 23/00* (2013.01); *E05C 19/166* (2013.01); *G07C 9/00134* (2013.01); *E05B 17/22* (2013.01); *E05B 2047/0065* (2013.01); *E05B 2047/0068* (2013.01); *H02J 9/005* (2013.01)

(58) Field of Classification Search
CPC ..... E05C 19/166; E05C 19/168; E05C 17/56; E05B 47/0002; E05B 65/108; E05B 17/22; E05B 2047/0068; E05B 47/00; E05B 17/2084; E05B 2047/0065; G08B 23/00; G07C 9/00134; H02J 9/005
See application file for complete search history.

(56) References Cited

U.S. PATENT DOCUMENTS

| | | | | |
|---|---|---|---|---|
| 2003/0121312 | A1* | 7/2003 | Harada et al. | ................ 73/35.07 |
| 2010/0325967 | A1* | 12/2010 | Pearson et al. | .................. 49/503 |
| 2011/0291846 | A1* | 12/2011 | Burdenko | ..................... 340/635 |

* cited by examiner

*Primary Examiner* — James Yang
(74) *Attorney, Agent, or Firm* — Rosenberg, Klein & Lee

(57) ABSTRACT

The invention relates to a security system with power saving feature and device comprises an electric magnet and a corresponding iron plate. The electric magnet is connected to a G-sensor module and the iron plate has a pressing face to contact with the G-sensor module. When the door is opened, the electric magnet does not supply power; when the door is closed, the electric magnet with electromagnetic attraction attracts the iron plate and the pressing face presses the G-sensor module. That is, the electromagnetic lock usually stays in a low-energy attraction state; however, when the G-sensor module is triggered, the electromagnetic lock returns to a normal lock state for achieving power saving effect and control of the external force detection improvement.

10 Claims, 10 Drawing Sheets

SECURITY SYSTEM WITH POWER SAVING FEATURE AND DEVICE

This patent application is a continuation-in-part of Ser. No. 12/835,712, filed on Jul. 13, 2010.

BACKGROUND OF THE INVENTION

1. Field of the Invention

The invention relates to a security system, particularly to the electromagnetic lock with G-Sensor detection and power saving device.

2. Description of the Related Art

In security industries or products (e.g., access control system), electromagnetic locks have been widely utilized. The conventional security system is required to uninterruptedly supply an electric power to the electromagnetic lock in order to generate in a sufficient electromagnetic field for the electromagnetic lock to remain in a tight attachment onto an iron plate. As such, the iron plate could be placed in a "lock" state. On the other hand, when the iron plate is to be unlocked the electric power supplied to the may need to be stopped. However, the power consumed by an electromagnetic lock driven by a general direct current (DC) power supply may range from about several Watts (W) to roughly tens of Watts; in case of 12 Volts (V) DC power supply, it will continuously consume a current of hundreds of milliamperes (mA) for the electromagnetic lock to properly operate. Therefore, the necessity of the continuous supply of the electric power for the conventional security system would leave the performance of the power consumption of the conventional security system a lot to be desired.

In response to the aforementioned unnecessary power consumption, other conventional security systems are configured to enter into a standby mode in which less power would be consumed. And such systems would operate normally once after awaken by a remote control. Thus, the total power consumption could be reduced. However, since the conventional security systems are unable to respond to any triggering event (e.g., access to the room behind the iron plate) immediately when operating in the standby mode the conventional security systems fail to meet the requirement of prompt response to the triggering event. Besides, as manual operation is necessary for these conventional security systems to switch from the standby mode the goal of automatic control for the access may not be achieved.

U.S. Pat. No. 5,668,929 discloses a "Speech Activated Security Systems and Methods" by Foster. The security device includes a microphone, a display for displaying a plurality of code elements, and a processor for controlling the display and analyzing the microphone signal to detect a proper sequence of code elements spoken by a user detected by the microphone and to operate the security device in response thereto. However, Foster does not disclose a G-Sensor detection and power saving device.

Besides, U.S. Pat. Nos. 3,998,482 and 5,754,373 nor disclose the G-Sensor detection and power saving device.

SUMMARY OF THE INVENTION

In view of the aforementioned issues, the technical problem that the present invention aims to resolve is to provide a security system meeting the requirements on both energy-saving and functional controls, allowing the security system to stay in a state requiring low power consumption, detecting any request for access by means of a sensing module, and thus controlling the locking/unlocking in the electromagnetic lock. In this way, the features of power saving as well as automatic prompt response to a triggering event can be achieved.

It is a second object of the present invention to provide the security system with power saving feature and device, which usually stays in a low-energy attraction state; however, when a G-sensor detection module is triggered, the electromagnetic lock returns to normal lock state for achieving power saving and access control security effects.

It is a last object of the present invention to provide the security system with power saving feature and device having an adsorption plate with buffering displacement design for an electric magnet to have sufficient time to resume operation to ensure the security of access control.

In order to achieve the above objects, the present invention includes security system with power saving feature and device, comprising: an electromagnetic lock 656 having an electric magnet 657 with electromagnetic attraction and an iron plate 658 arranged on a corresponding surface thereof; a power supply circuit 662 providing power for the electric magnet 657; and a sensing module 664 electrically connected to the electric magnet 657 and detecting a signal cause by an environment change at which point the sensing module 664 is configured to output a triggering signal to cause a full supply of the electric power from the power supply circuit 662 to the electromagnetic lock 656.

Wherein the sensing module 664 is a G-sensor module and the G-sensor module 664 includes: a plate 71, an elastic member 72 arranged on the plate 71, a G-sensor 73 arranged on the elastic member 72 and electrically connected to the power supply circuit 662, an abutment body 74 arranged on the G-sensor 73 and having a protrusion portion 741 and a positioning flange 742 at a periphery thereof, and a seat 75 having an axial through hole 751 for the abutment body 74 to be axially telescoped therein and the telescopic abutment body 74 driving the G-sensor 73 to provide an upward elastic force for the abutment body 74 by the elastic member 72; the iron plate 658 includes a spot-faced hole 671 and locked on a door board 654 from an inner side thereof by the spot-faced hole 671 and a bolt assembly 668, and a spring 674 mounted on the bolt assembly 668 for having an elastic displacement space between the inner side of the iron plate 658 and the door board 654; a pressing face 655 mounted on the iron plate 658 and having a front side contacted with the abutment body 74 of the G-sensor module 664.

Whereby when the iron plate 658 is held by the electric magnet 657, the abutment body 74 of the G-sensor module 664 is pressed by the pressing face 655 to simultaneously drive the inward movement of the G-sensor 73 and compress the elastic member 72; at the same time, the electric magnet 657 is in a low power attraction state; when the abutment body 74 of the G-sensor module 664 is moved by an external action, the G-sensor 73 is activated by the displacement of the elastic member 72 to return to normal current supply and rapidly get into the normal lock state.

DETAILED DESCRIPTION OF THE PREFERRED EMBODIMENT

The present invention provides a security system with power saving feature and device. More specifically, the present invention security system is configured to detect if there is any request for access before the full supply of electric power to the electromagnetic lock. Typically, the security system is applied to an access control system, and an emergency doorway that is capable of allowing the passage of persons or goods when necessary. By means of the design disclosed herein, it is possible to allow the electromagnetic lock in the security system to remain in a lock state with limited power consumption; but, in case that a user approaches to or intends to pass through the monitored passage, then the security system immediately responds and supplies the required power (e.g., the full power supply) to the electromagnetic lock so that the electromagnetic lock could continue to operate in the lock state. Thus the requirements on both power saving and automatic control can be effectively met.

Figure 1:
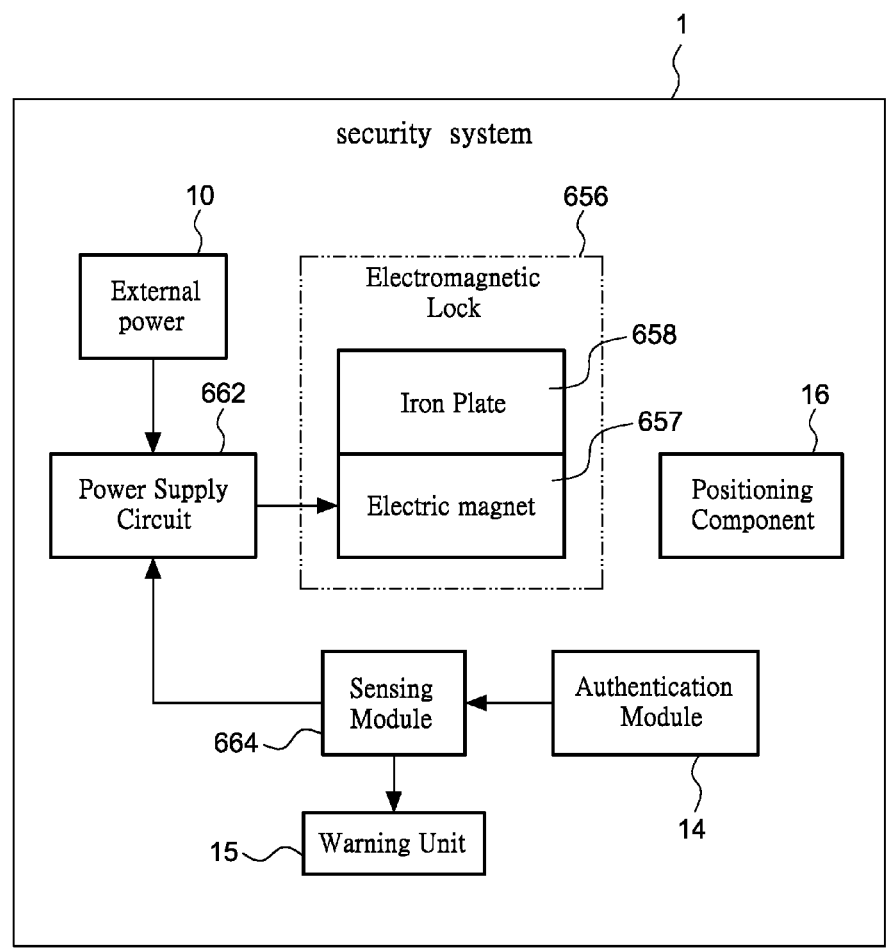
FIG. 1 is a block diagram for an embodiment of the security system with power saving feature in accordance with the present invention.

Refer to FIG. 1, wherein a block diagram for an embodiment of the security system with power saving feature and device according to the present invention is shown. As shown in FIG. 1, the present embodiment provides a security system 1 comprising a power supply circuit 662, an electromagnetic lock 656, a sensing module 664 and an authentication module 14. Herein the power supply circuit 662 is used to receive the external power 10 associated and provide the required power supply with the security system 1 for the security system 1 to operate.

The electromagnetic lock 656 is electrically coupled to the power supply circuit 662 for remaining in a lock state. Besides, for those skilled ones in the art, it is appreciable that the electromagnetic lock 656 usually operates in conjunction with an iron plate 658 for implementing the lock state. Also, in practice, the electromagnetic lock 656 may be placed on a door frame 652 as shown in FIGS. 3 to 6 while the iron plate is installed as door board 654 or on a wall and door frame 652. In one implementation, the iron plate 658 is placed on the other side of the door corresponding to where the electromagnetic lock 656 is installed.

The sensing module 664 stands for the core of control in the security system 1 according to the present embodiment. The sensing module 664 is used to control the supply of electric power. The sensing module 664 by default is configured to cause a small amount of maintain current delivered to the electromagnetic lock 656, thus allowing the electromagnetic lock 656 to be usually in the lock state with less power consumption, and the sensing module 664 outputs a triggering signal after detecting a specific action signal caused by an environment change. The triggering signal may cause the full supply of the electric power from the power supply circuit 662 to be delivered to the electromagnetic lock 656 so that the electromagnetic lock 656 may stay in the lock state with the regular power consumption. In one implementation, the sensing module 664 may be configured as being placed within, or installed outside of, a case (not shown) of electromagnetic lock 656, and connected to the power supply circuit 662 through embedded or externally linked wires.

The authentication module 14 is connected to the sensing module 664 and generates an authentication signal based on an access data in order to control the sensing module 664 to pause the output of the triggering signal within a predetermined period of an access time after the generation of the identification card which interacts with the authentication module 14 through a short-range transmission technology (e.g., RFID), such that the authentication module 14 can accordingly generate the authentication signal. In other words, when the authentication module 14 identifies and authenticates the identification card, the authentication module 14 may stop outputting triggering signal during the predetermined access time, which may begin after the detection of the authentication signal. More specifically, during the predetermined access time the sensing module 664 is configured not to output the triggering signal even detecting the specific action signal caused by an environment change.

The above-illustrated description allows for implementing the security system 1 with a power saving feature according to the present invention. The security monitoring system 1 may further include a warning unit 15, such as an alarm, a speaker, a light indicator or other equipment, and the sensing module 664 is also further configured to continue outputting the triggering signal during a predetermined period of a delay time when no longer detecting the specific action signal caused by an environment change. And the sensing module 664 may stop outputting the triggering signal until after the end of the delay time. In doing so, the present invention security system 1 may cause the electromagnetic lock 656 to remain in the lock state during the delay time and after the elapse of a delay time cause the electromagnetic lock 656 to be switched to the in lock state. The purpose of such an arrangement is essentially to hold the electromagnetic lock 656 in the lock state up to the end of delay time after disappearance of the specific action signal, and switches to the unlock state only after elapse of the delay time. Since the warning unit 15 is connected to the sensing module 664 and under control thereof, the sensing module 664 further controls the warning unit 15 to generate a warning signal during the delay time. The sensing module 664 may be configured to operate along with another electromagnetic sensor. The function of that particular electromagnetic sensor will be subsequently discussed in more detail.

Finally, since the aforementioned electromagnetic lock 656 and the iron plate may be respectively installed on the door frame and the door board, which may result in a slight gap between the door board and the door frame when the electromagnetic lock 656 is switched back to the lock state, the security system 1 may further provide a positioning component 16 for minimizing the gap between the door board and the door frame. The positioning component 16 may be a magnet, a door operator, or a steel ball latch etc.

Figure 2:
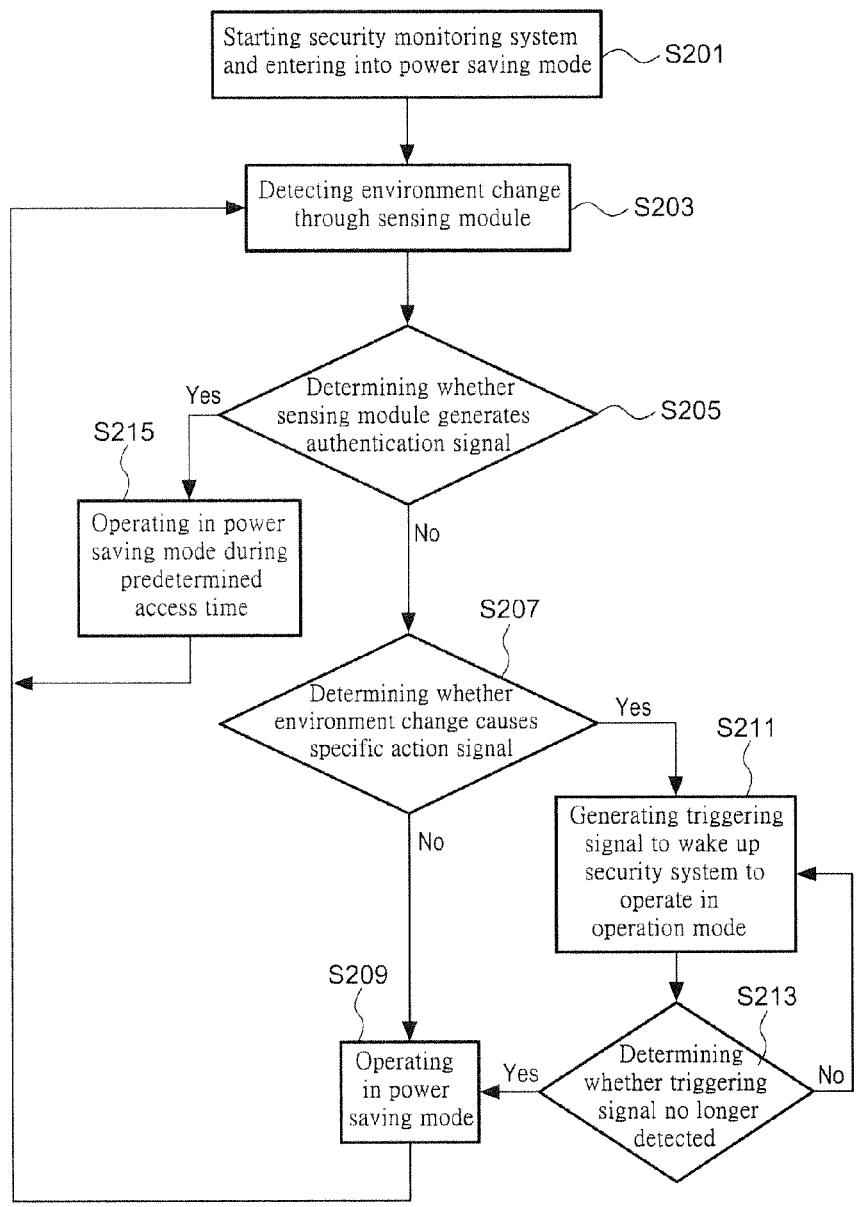
FIG. 2 is a flowchart of the present invention, illustrating an operating method for the security system in FIG. 1.

To further illustrate practical operations of the security system 1 with power saving feature according to the present invention, refer now to FIG. 2, which is a flowchart illustrating an operating method for the security system 1 shown in FIG. 1. As shown in FIG. 2, the step of the operating method includes starting the security system 1 and causing the security system to enter into a power saving mode (S201), determining whether the sensing module 664 detects an environment change (S203) through the receipt of the action signal caused by the environment change, and causing the authentication module 14 to receive an access data before the authentication module 14 generate an authentication signal accordingly (S205). It is worth noting that when operating in the power saving mode the security system may still operate with a maintaining current.

Suppose the determination in S205 is negative, the operation method may further determine whether the environment change detected by the sensing module 664 causes a specific action signal (207), in which the specific action signal in design may vary from one sensing module to another sensing module adopted by the security system 1.

In case the determination in S207 is negative, indicating no matching specific action signal is detected by the sensing module 664, the operating method mat cause the security system 1 to operate in a power saving mode (S209). Otherwise, when the sensing module 664 has detected the matching specific action signal caused by the environment change the operating method may cause the sensing module 664 to generate the triggering signal for switching the security system 1 from operating in the power saving mode to operation in an operation mode (S211). It should be noted that so-called "power saving mode" refers to a mode in which the security system 1 operates with the maintaining current or, in other words, with small amount of the supply of the electric power to an electromagnetic lock 656, despite the electromagnetic lock 656 may still stay in the lock state; while the "operation mode" means the security system 1 operates with the full amount of the supply of the electric power to the electromagnetic lock 656, which may continue operating in the lock state.

Subsequently, after S211 the operating method further includes determining whether the triggering signal issued by the sensing module 664 could no longer be detected (S213); when the determination in S213 is negative, indicating the specific action signal caused by the environment change is still present, the operating method thus repeats S211 allowing the sensing module 664 to continue the output of the triggering signal. When the determination in S213 is affirmative, indicating the specific action signal caused by the environment change no longer exists, the operating method thus causes the output of the triggering signal from the sensing module 664 to be stopped. And the operating method may cause the security system 1 to operate in the power-saving mode again with the limited amount of the electric power to the electromagnetic lock 656 from the power supply circuit 662 (S209).

On the other hand, suppose the determination id S205 is affirmative, meaning the authentication module 14 has authenticated the access data and generated the authentication signal, the operating method may cause the sensing, module 664 to stop the output of the triggering signal during the predetermined access time after the reception of the authentication signal, disabling the security system 1 during the predetermined access period. In other words, during the predetermined access time, no matter the sensing module 664 detects any other matching specific action signal or not, the operating method may never cause the sensing module 664 to resume the output the triggering signal. In doing so, the security system 1 may allow the passage of goods or persons during the predetermined access time.

The method may repeat S203 and other following steps after S209 and S215.

Figure 3:
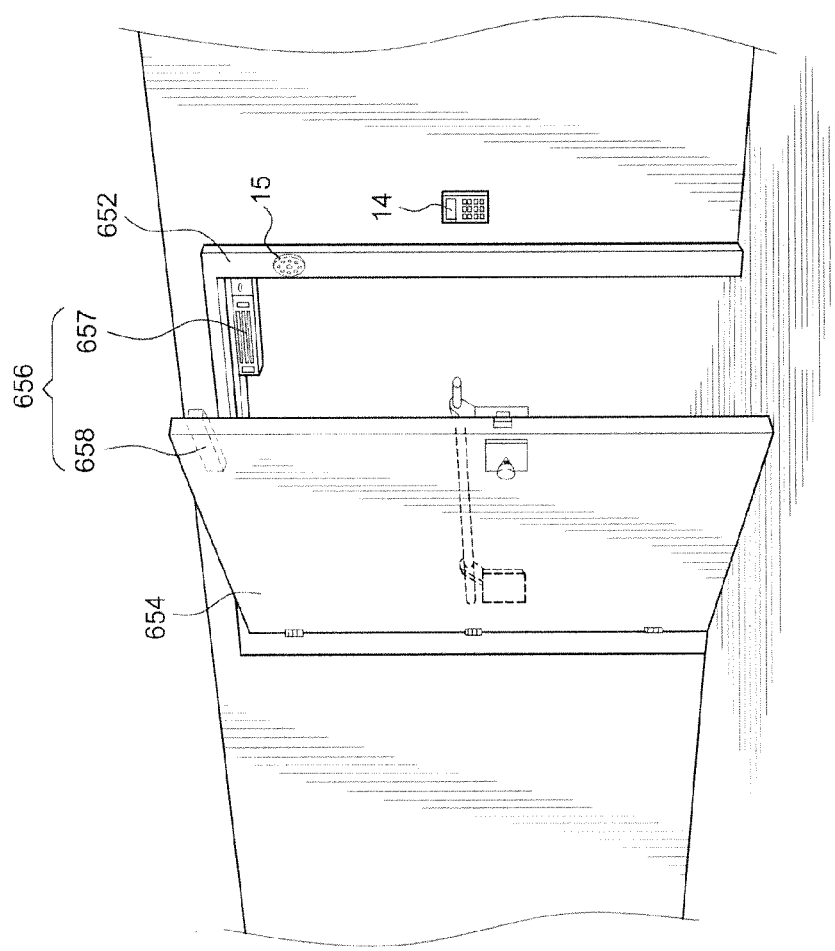
FIG. 3 is a schematic view of the preferred embodiment in accordance with the present invention.

The next embodiment is presented to further exemplarily explain the configuration of the security system according to the present invention operating in conjunction with different types of sensing modules. First, refer to FIG. 3, wherein a schematic diagram illustrating the security system according to one embodiment of the present invention is shown. As shown in FIG. 3, the electromagnetic lock 656 in the security system according to the present embodiment is installed on the door frame 652 and door board 654. And in default the electromagnetic lock 656 is in the state with the limited supply of the electric power for energy saving purpose. The sensing module cooperatively employed in the present embodiment is so-called G-sensor and is installed inside of the electromagnetic lock 656. The G-sensor is used to provide information concerning speed and movement, in which, upon the door board 654 being touched, the G-sensor senses vibrations from the door board 654 and the acceleration associated with the door board 654, both of which may match the specific action signal of the G-sensor. The G-sensor may thus output the triggering signal. The output of the triggering signal may immediately cause the full supply of the electric power to the electromagnetic lock 656 so as to lock up the door board 654. In this way, although the electromagnetic lock 656 is usually in the power-saving mode and in the lock state, as soon as any vibration originates from the door board 654 or the acceleration associated with the door board 654 has been detected the electromagnetic lock 656 may be configured to continue operating in the electromagnetic lock 656 may be configured to continue operating in the lock state to block the passage of people or goods.

Additionally, the security system of the present embodiment is further conjunctively configured with an authentication module 14. So, when the identification card (not shown) having the required access data therein is sensed by the authentication module 14, the G-sensor will stop outputting the triggering signal during the predetermined access time, causing the electromagnetic lock 656 to switch to the unlock state within the access time and to enable the passage.

Figure 6:
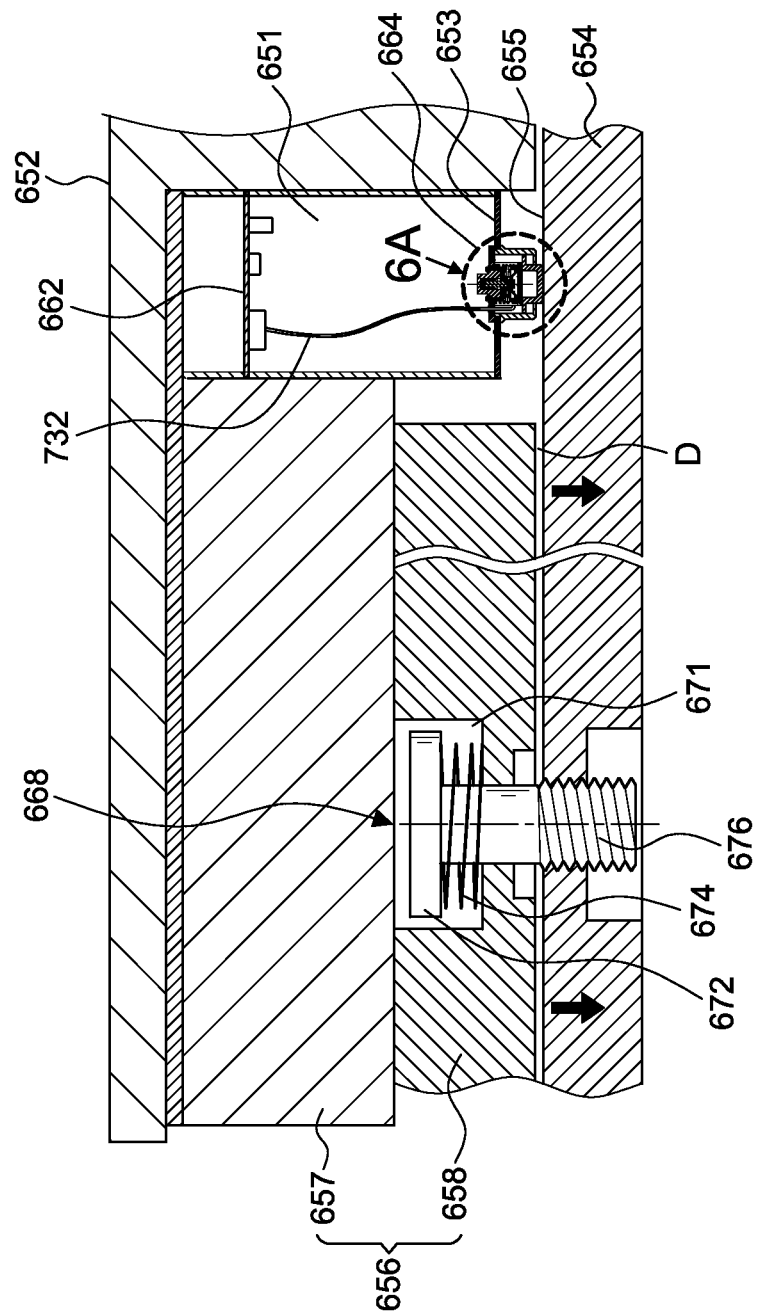
FIG. 6 is a schematic view of the present invention, illustrating the electric magnet and the iron plate are to be separated.
Figure 6A:
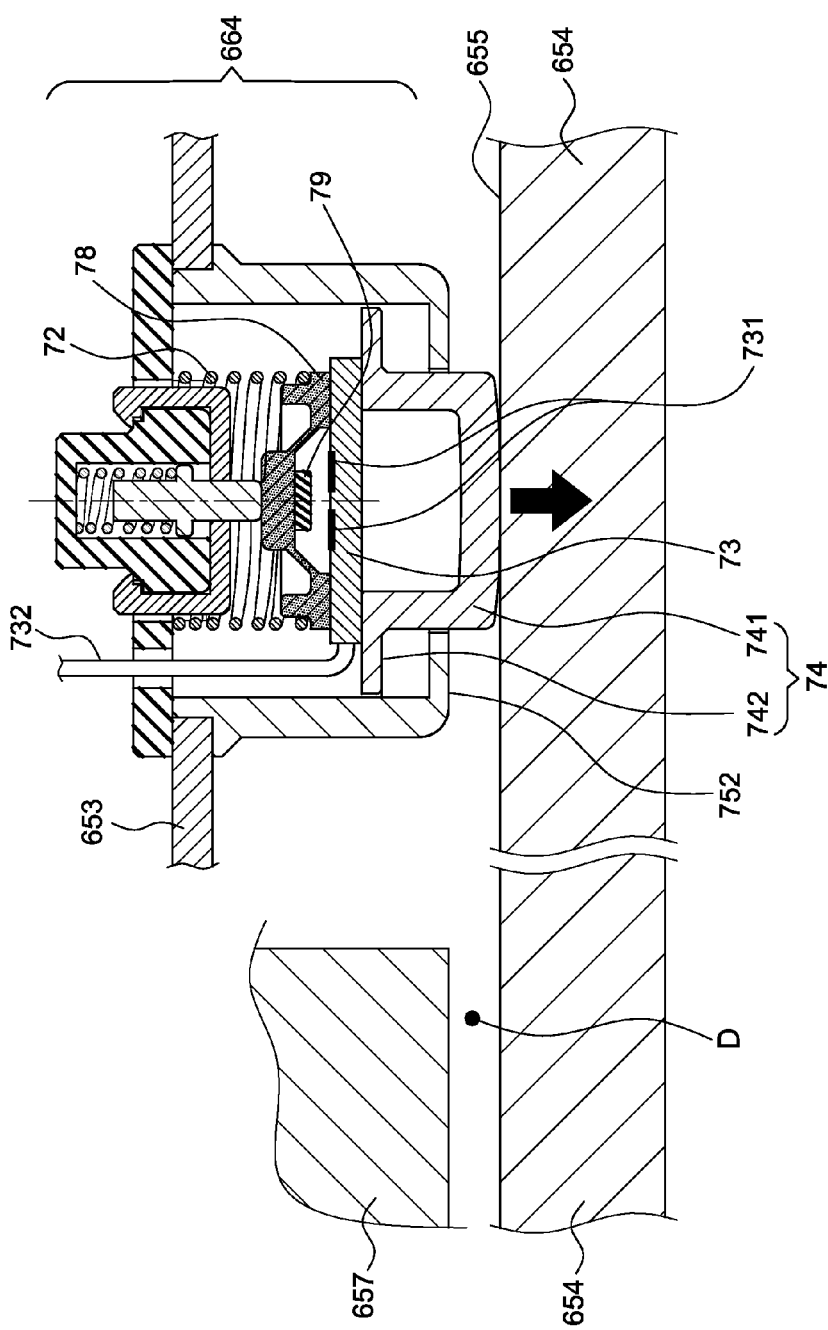
FIG. 6A is an enlarged view of section 6A of FIG. 6 in accordance with the present invention.
Figure 7:
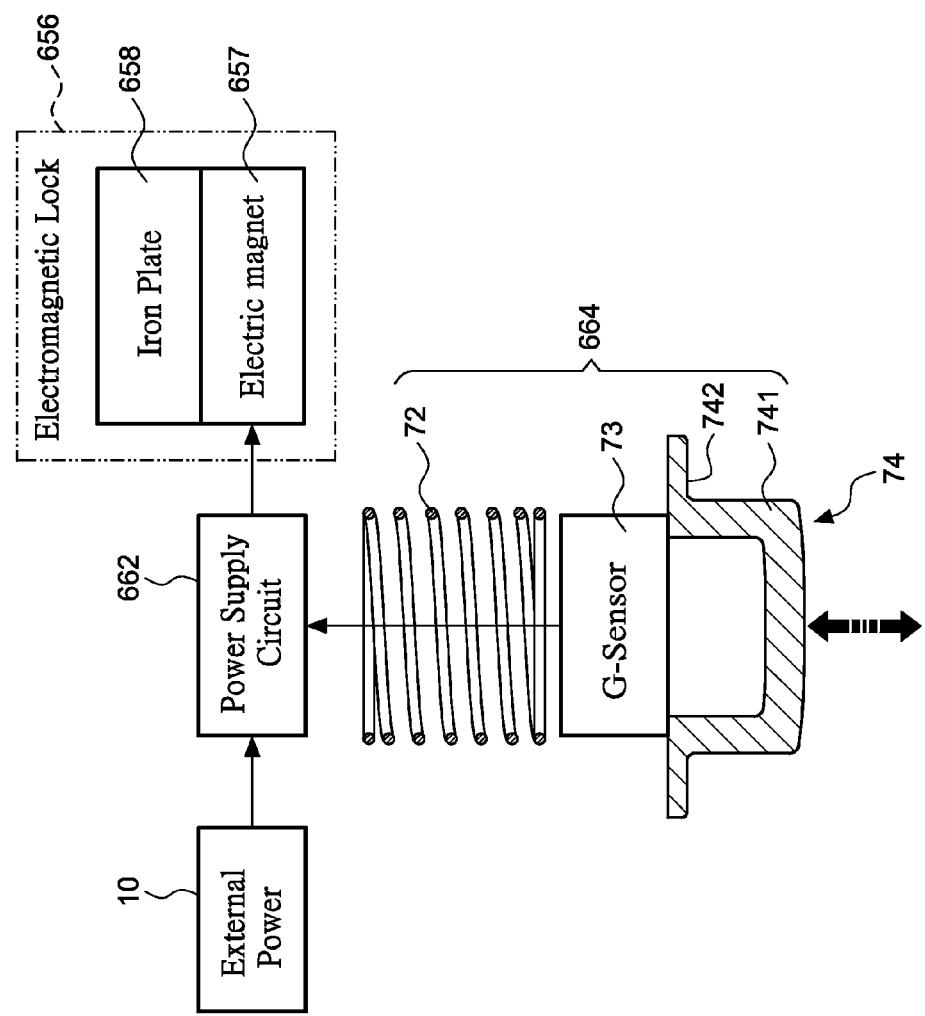
FIG. 7 is a control block view of the present invention.

The present invention continues the main structure of the previous application as shown in FIG. 6A to provide the sensing module 664 in details. With the referenced to FIGS. 3 through 7, the present invention discloses the electromagnetic lock 656 having an electric magnet 657 with electromagnetic attraction and the iron plate 658 arranged on a corresponding surface thereof; the power supply circuit 662 providing power for the electric magnet 657; and the sensing module 664 electrically connected to the electric magnet 657 and detecting a signal cause by the environment change at which point the sensing module 664 is configured to output a triggering signal to cause a full supply of the electric power from the power supply circuit 662 to the electromagnetic lock 656. However, the aforesaid structure is disclosed in the previous application and thus will not be described in details here.

The main features of the present invention comprise the sensing module 664 is a G-sensor module 664 and the G-sensor module 664 includes: a plate 71, an elastic member 72 arranged on the plate 71, a G-sensor 73 arranged on the elastic member 72 and electrically connected to the power supply circuit 662, an abutment body 74 arranged on the G-sensor 73 and having a protrusion portion 741 and a positioning flange 742 at a periphery thereof, and a seat 75 having an axial through hole 751 for the abutment body 74 to be axially telescoped therein and the telescopic abutment body 74 driving the G-sensor 73 to provide an upward elastic force for the abutment body 74 by the elastic member 72. In the embodiment, the electric magnet 657 is arranged on a door frame 652 and the iron plate 658 is correspondingly arranged on the door board 654 and the electric magnet 657 has a containing room 651 with a cover 653 at an opening thereof and the cover 653 has a mounted hole 659 thereon for mounting the G-sensor module 664. With the referenced to FIG. 4A, the seat 75 is mounted on the mounted hole 659.

The iron plate 658 includes a spot-faced hole 671 and is locked on a door board 654 from an inner side of the iron plate 658 by the spot-faced hole 671 and a bolt assembly 668, and a spring 674 is mounted on the bolt assembly 668 for having an elastic displacement space between the inner side of the iron plate 658 and the door board 654. In the embodiment, the iron plate 658 is directly mounted on the door board 654 but it is not a limitation. The iron plate 658 may be mounted on a mounted board locked on the door board 654.

A pressing face 655 mounted on the iron plate 658 and having a front side contacted with the abutment body 74 of the G-sensor module 664.

Whereby when the iron plate 658 is attracted by the electric magnet 657, the abutment body 74 of the G-sensor module 664 is pressed by the pressing face 655 to simultaneously drive the inward movement of the G-sensor 73 and compress the elastic member 72; at the same time, the electric magnet 657 is in a low power attraction state; when the abutment body 74 of the G-sensor module 664 is moved by an external action, the G-sensor 73 is activated by the displacement of the elastic member 72 to return to normal current supply and rapidly get into the normal lock state.

In the embodiment, the G-sensor module 664 further includes the plate 71 having a post hole 711 with an upward opening at a center thereof; a shaft 76 having a flange 761 at a middle section and a small spring 762 arranged on a lower section thereof and arranged in the post hole 711; a positioning sleeve 77 having a hook body 771 at a side thereof for fixing on a fixed hole arranged at a periphery of the post hole 711 and corresponding to the post hole 711 has a through hole 772 for arranging an upper section of the shaft 76; a recessed flexible body 78 across set on the elastic member 72 and having a recessed center 781 corresponding to a top of the shaft 76; and an electrical trigger 79 arranged on the recessed flexible body 78 and corresponding to a trigger area 731 at a bottom surface of the G-sensor 73.

In the embodiment, the pressing face 655 is locked on the corresponding position of the door board 654 or extended from a side of the iron plate 658. As for choosing pressing surface 655, it depends on the types and specifications of the electromagnetic lock 656, which is not the features of the invention and thus will not be described in details.

Figure 4:
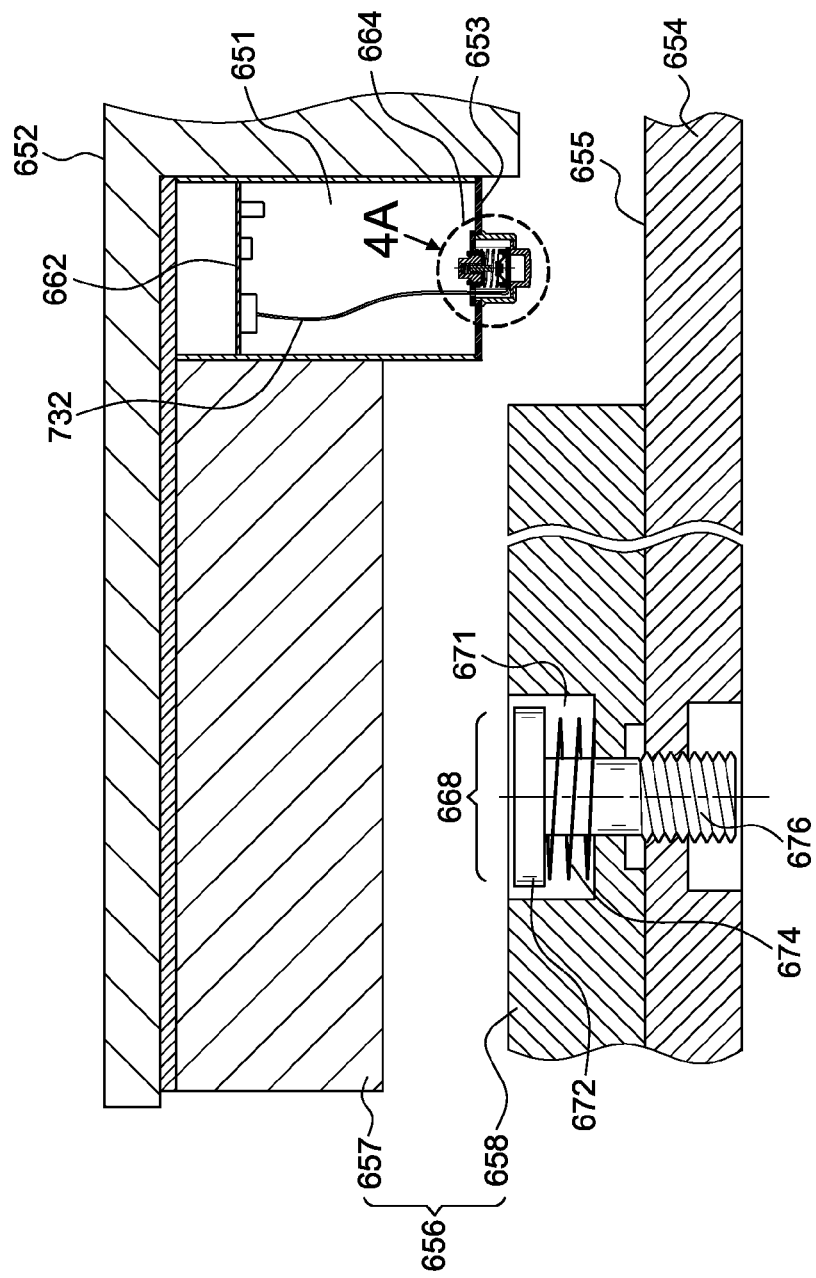
FIG. 4 is a sectional view of the present invention, illustrating the separation of an electric magnet and an iron plate.
Figure 4A:
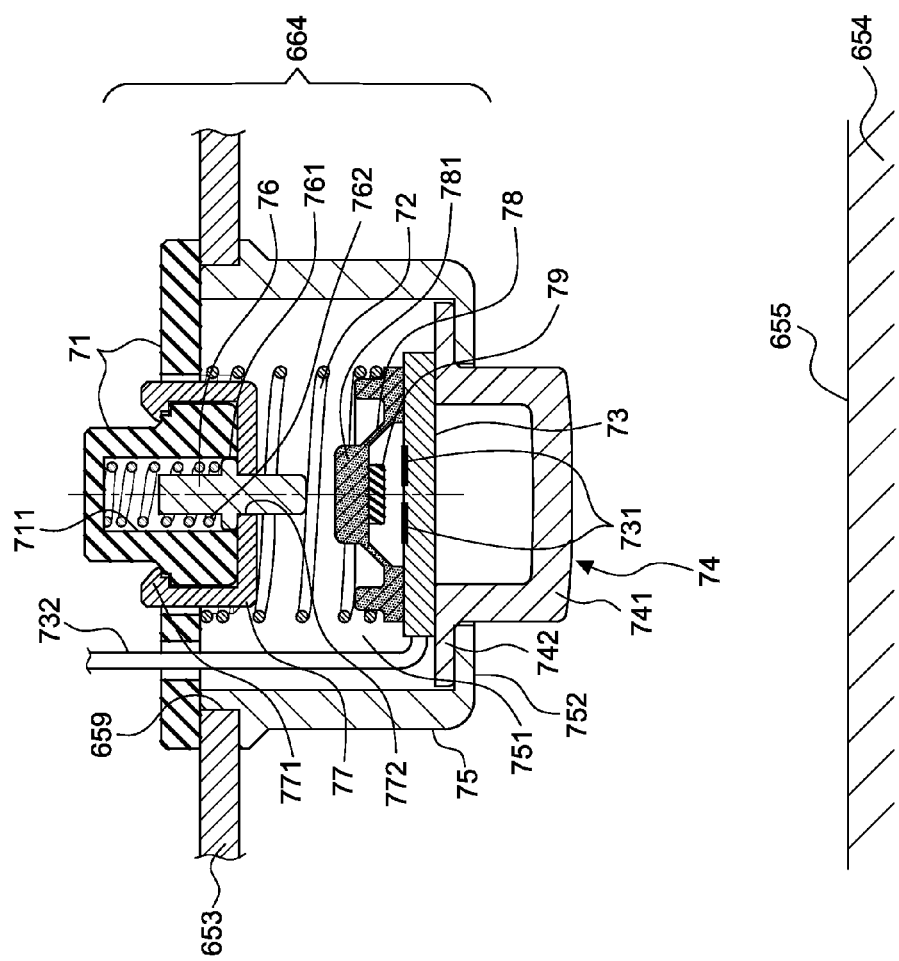
FIG. 4A is an enlarged view of part 4A of FIG. 4 in accordance with the present invention.
Figure 5:
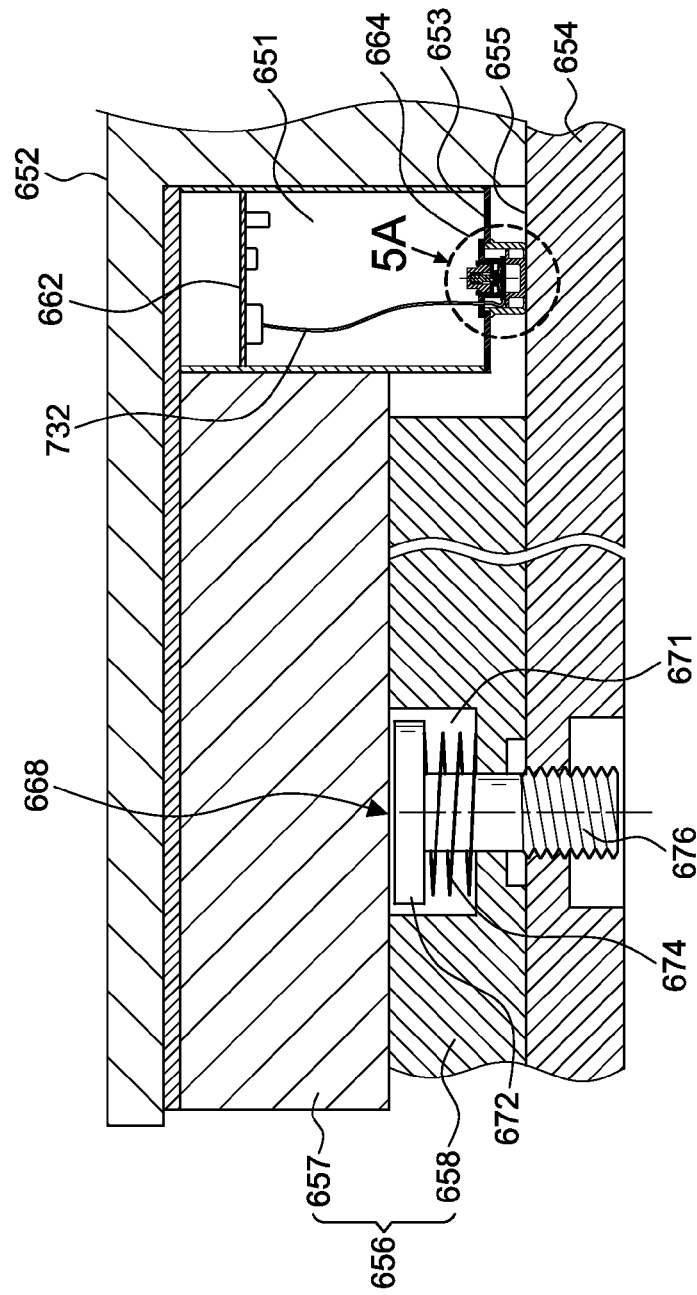
FIG. 5 is a sectional view of the present invention, illustrating the abutment of the electric magnet and the iron plate.
Figure 5A:
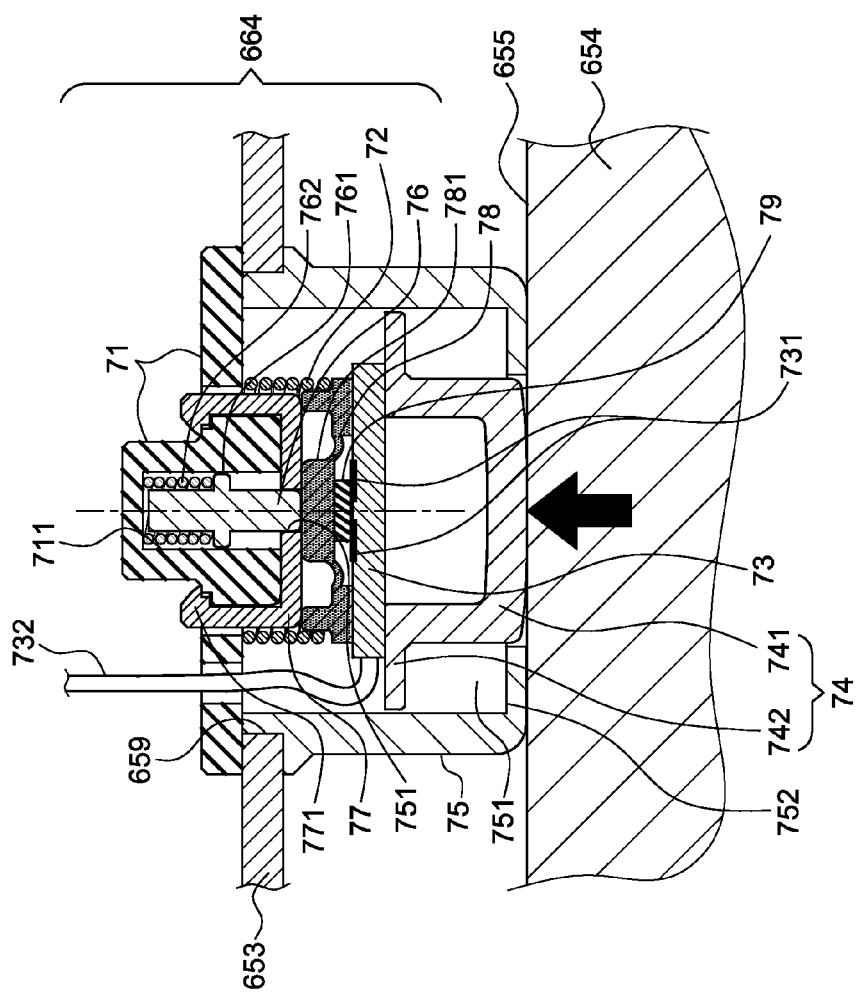
FIG. 5A is an enlarged view of part 5A of FIG. 4 in accordance with the present invention.

Based on the features disclosed as shown in FIGS. 4 and 4A, when the door board 654 is opened, the pressing unit 655 does not contact with the abutment body 74 on the door frame 652 and the power supply circuit 662 does not supply the normal power to the electric magnet 657. With the referenced to FIGS. 5 and 5A, when the door board 654 and the door frame 652 are closed together, the pressing face 655 presses to the abutment body 74 of the G-sensor module 664 and the abutment body 74 drives the G-sensor 73 inward displaced for the trigger zone 731 to contact with the electrical trigger 79 on the recessed flexible body 78 in order to trigger the power supply circuit 662 controlling the electric magnet 657 attracting the iron plate 658 to be in a lock state. When the door board 654 is still, the present invention goes into a low power attraction state. In the embodiment, the electrical trigger 79 may be any conductive material which can trigger the trigger zone 731. With the referenced to FIG. 5A, the shaft 76 is upward pushed to the recessed flexible body 78 by a small spring 762.

The present invention provides the G-sensor module 7 composed of the G-sensor 73 as a sensing member to sense the external environment change. In the preferred embodiment, the G-sensor 73 may be composed of an acceleration sensor which is called G-sensor hereafter. The G-sensor senses objects in a motion state generating the acceleration of gravity in a three-axis space and so-called a linear accelerometer. The G-sensor can sense the minute changes in the physical quantity, such as displacement and vibration. The G-sensor 73 is arranged on the spring 72; therefore, once the door board 654 has a little displacement, the G-sensor module 664 immediately detects the shock and triggers the power supply circuit 662 in a very short time to supply the normal power to the elastic magnet 657 and to be in a lock state.

Therefore, the present invention provides the G-sensor 73 to link to the elastic member 72 such that when the door board 654 is instantly displaced, the G-sensor 73 rapidly reacts through the elastic force of the elastic member 72; before the door board 654 has been pushed and opened, the present invention returns to normal current supply, achieving the desired safety purpose. If the electromagnetic lock 656 requires 1200 pounds of electromagnetic attraction to stay in the lock state, the electromagnetic lock 656 requires 500 mA current. Moreover, to maintain normal power supply for 24 hours, the power consumption is considerable. For this reason, the present invention provides small current such as 100 mA for the electric magnet 657 when the door board 654 is still and closed such that the electromagnetic lock 656 produces small attraction to attract the iron plate 658. When people push or destroy the door, the G-sensor 73 reacts rapidly to return to the normal power supply and stay in a lock state with normal current, achieving access control security and saving power.

Moreover, the present invention provides the iron plate 658 to assist the G-sensor module 664 and the iron plate 658 corresponding to the electric magnet 657 is boned contact. With the referenced to FIG. 5, the electric magnet 657 usually maintains basic attraction state with low power. With the referenced to FIGS. 6 and 6A, when the door board 654 is pushed, the iron plate 568 is still bonded with the electric magnet 567 and the door board 654 is displaced for a small distance D. The spring 674 in the spot-faced hole 671 provides a displacement buffering function such that when the iron plate 568 contacts with the door board 654, there is enough time for the power supply circuit 662 sending the normal current to the electric magnet 567 in order to achieve the safety purpose.

What is claimed is:

1. A security system with a power saving feature and device, comprising:

an electromagnetic lock having an electric magnet with electromagnetic attraction and an iron plate arranged on a corresponding surface thereof;

a power supply circuit providing power for the electric magnet; and a sensing module electrically connected to the electric magnet and detecting a signal caused by an environment change at which point the sensing module is configured to output a triggering signal to cause a full supply of the electric power from the power supply circuit to the electromagnetic lock;

wherein the sensing module is a G-sensor module and the G-sensor module includes: a plate, an elastic member arranged on the plate, a G-sensor arranged on the elastic member and electrically connected to the power supply circuit, an abutment body arranged on the G-sensor and having a protrusion portion and a positioning flange at a periphery thereof, and a seat having an axial through hole for the abutment body to be axially telescoped therein and the telescopic abutment body driving the G-sensor to provide an upward elastic force for the abutment body by the elastic member;

the iron plate includes a spot-faced hole and is locked on a door board from an inner side of the iron plate by the spot-faced hole and a bolt assembly, and a spring is mounted on the bolt assembly for having an elastic displacement space between the inner side of the iron plate and the door board;

a pressing face mounted on the iron plate and having a front side contacted with the abutment body of the G-sensor module;

whereby when the iron plate is held by the electric magnet, the abutment body of the G-sensor module is pressed by the pressing face to simultaneously drive the inward movement of the G-sensor and compress the elastic member; at the same time, the electric magnet is in a low power attraction state; when the abutment body of the G-sensor module is moved by an external action, the G-sensor is activated by the displacement of the elastic member to return to a normal current supply and get into a normal lock state.

2. The security system with a power saving feature and device as claimed in claim 1, wherein the elastic member is a spring.

3. The security system with a power saving feature and device as claimed in claim 1, wherein the electric magnet is arranged on a door frame and the iron plate is correspondingly arranged on the door board and the electric magnet has a containing room with a cover at an opening thereof and the cover has a mounted hole thereon for mounting the G-sensor module.

4. The security system with a power saving feature and device as claimed in claim 3, wherein the G-sensor module further includes:

the plate having a post hole with an upward opening at a center thereof;

a shaft having a flange at a middle section and a small spring arranged on a lower section thereof and arranged in the post hole;

a positioning sleeve having a hook body at a side thereof for fixing on a fixed hole arranged at a periphery of the post hole and corresponding to the post hole has a through hole for arranging an upper section of the shaft;

a recessed flexible body across set on the elastic member and having a recessed center corresponding to a top of the shaft; and an electrical trigger arranged on the recessed flexible body and corresponding to a trigger area at a bottom surface of the G-sensor.

5. The security system with a power saving feature and device as claimed in claim 3, wherein the power supply circuit is arranged in the containing room of the electric magnet and an end thereof is connected to an external power and another end is electronically connected to the elastic magnet to control the power supply to the electric magnet.

6. The security system with a power saving feature and device as claimed in claim 3, wherein the pressing face is locked on the corresponding position of the door board or extended from a side of the iron plate.

7. The security system with a power saving feature and device as claimed in claim 1, further comprising:

an authentication module, which is connected to the sensing module and generate an authentication signal, based on an access data so as to control the sensing module to stop an output of the triggering signal during a predetermined period of an access time after a generation of the authentication signal.

8. The security system with a power saving feature and device as claimed in claim 1, wherein the sensing module is further configured to continue an output of the triggering signal after no longer detecting the external action for a predetermined period of a delay time and is configured to stop the output of the triggering signal after expiration of the delay time.

9. The security system with a power saving feature and device as claimed in claim 1, further comprising:

a warning unit, which is connected to the sensing module and under control of the sensing module so as to generate a warning signal during a delay time.

10. The security system with a power saving feature and device as claimed in claim 9, wherein the warning unit is an alarm, a speaker or a light indicator.

* * * * *